United States Patent [19]

Sandford et al.

[11] 4,184,072
[45] Jan. 15, 1980

[54] SOLAR CELL ANGULAR POSITION TRANSDUCER

[75] Inventors: Maynard C. Sandford, Hampton; David L. Gray, Newport News, both of Va.

[73] Assignee: The United States of America as represented by the Administrator of the National Aeronautics and Space Administration, Washington, D.C.

[21] Appl. No.: 876,299

[22] Filed: Feb. 9, 1978

[51] Int. Cl.$^2$ .............................................. G01D 5/34
[52] U.S. Cl. .......................... 250/231 SE; 250/211 K
[58] Field of Search ......... 250/211 K, 231 SE, 231 R

[56] References Cited

U.S. PATENT DOCUMENTS

| | | | |
|---|---|---|---|
| 3,358,150 | 12/1967 | Summer | 250/211 K |
| 4,103,155 | 7/1978 | Clark | 250/211 K X |

Primary Examiner—David C. Nelms
Assistant Examiner—Darwin R. Hostetter
Attorney, Agent, or Firm—Howard J. Osborn; John R. Manning; John G. Mannix

[57] ABSTRACT

An angular position transducer utilizing photocells and a light source is disclosed. The device uses a fully rotatable baffle which is connected via an actuator shaft to the body whose rotational displacement is to be measured. The baffle blocks the light path between the light source and the photocells so that a constant semicircular beam of light reaches the photocells.

When the assembly is in the null position the illuminated area of each of the photocells is equal. As the actuator shaft rotates, the baffle also rotates which causes an increase in the area of illumination of one of the photocells together with an equal decrease in the area of illumination of the other photocell.

The current produced by the photocells is fed through a resistor, a differential amplifier measures the voltage drop across the resistor which indicates the angular position of the actuator shaft and hence of the object.

10 Claims, 11 Drawing Figures

MOTOR POSITION PHOTOCELL CALIBRATION DATA

SOLAR CELL ANGULAR POSITION TRANSDUCER

ORIGIN OF THE INVENTION

The invention described herein was made by employees of the United States Government and may be manufactured and used by or for the Government for governmental purposes without the payment of any royalties thereon or therefore.

BACKGROUND OF THE INVENTION

This invention relates to a device that can accurately ascertain the angular displacement of an object. And more particularly to a device that determines the control surface angular displacement of wind tunnel scaled models of aircraft.

DESCRIPTION OF THE PRIOR ART

Wind tunnel tests are frequently made with model versions of airplane designs. It is important to know the angles of the control surfaces of the model throughout the test.

The prior art used potentiometers as angular position transducers. Potentiometers make use of a variable resistor to adjust their output voltage. A potentiometer is connected to the actuator shaft of a control surface. Any change in the angular position of the shaft varies the resistance of the potentiometer thus varying the output voltage of the potentiometer. The angle of the control surface is easily ascertained by measuring the voltage at the output of the potentiometer.

The smallest potentiometer available for this purpose measures one-half inch in diameter. In some models space limitations do not allow the use of the potentiometer. This is because it is essential that the measuring device does not interfere with the aerodynamics of the model.

OBJECTS OF THE INVENTION

It is, therefore, an object of the present invention to disclose an angular position transducer that is smaller in size than a potentiometer.

A further object of the present invention is to disclose a photocell angular position transducer that can measure rotations as opposed to mere oscillations.

Another object of the present invention is to disclose a device that can measure large and small angles with accuracy.

An additional object of the present invention is to disclose a photocell angular position transducer that has no moving wires, thus avoiding wire tangling and other problems associated with moving wires.

A further object of the present invention is to disclose a photocell angular position transducer that is not sensitive to exterior light.

These and other advantages of the invention will be readily apparent when considered in reference to the description and claims and taken in connection with the attached drawing to which they relate.

SUMMARY OF THE INVENTION

The angular position transducer uses two silicon photocells mounted on a common base. A housing block with a cylindrical hole isolates the photocells from external light sources. A light source is positioned at one end of the housing and the photocells are positioned at the other end. A baffle is located in the center of the housing block in such a way as to allow illumination of one-half of each photocell with a uniform light. The baffle is attached to a small shaft, lying on the longitudinal axis of the housing, which is fitted to the inner bore of two miniature precision ball bearings.

The bearing arrangement allows only rotary motions of the baffle with respect to the stationary light source and photocells.

As the control surface shaft is rotated from a zero null position, one photocell receives more illumination than the other, the current produced by the photocell is proportional to the shaft rotational angle. This current is fed through a resistor and the voltage drop thereof is measured by a high gain differential amplifier. The voltage is related, through a calibration procedure, to the control surface angular position.

DETAILED DESCRIPTION OF THE INVENTION

The invention can be understood best by referrinbg to the drawings in which any particular numeral designates the same element throughout the figures.

Figure 1:
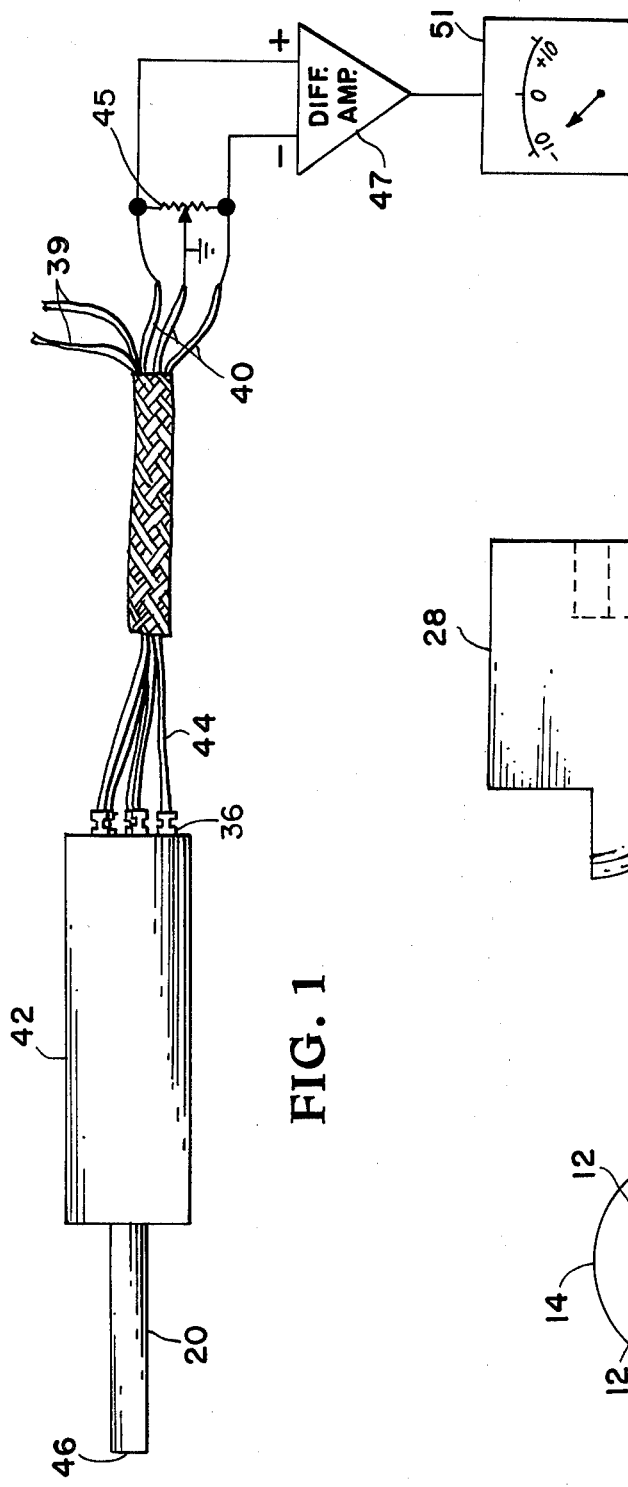
FIG. 1 is a side view of the assembled device.

FIG. 1 displays the assembled device with the accompanying circuitry. The invention includes a cylindrical housing block 42 supporting actuator shaft 20 which lies along and rotates on the longitudinal axis of the housing block 42. The end of the actuator shaft 46 is connectable to the object whose rotation is to be measured.

Wires, designated generally as 44, emerging from the housing block 42 include wires 39 which supply electricity to the light source 12 (shown in FIG. 2), and wires 40 which carry the current produced by the photocells 34 (FIG. 2) to a potentiometer 45. The current travelling through the potentiometer 45 causes a voltage drop across the resistor therein. This voltage is measured by a differential amplifier 47. This voltage is displayed on meter 51.

Figure 5A:
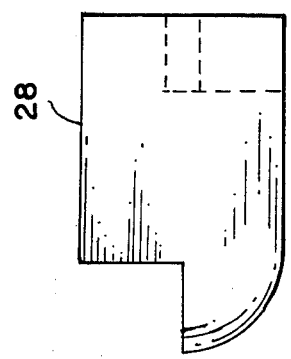
FIG. 5a is a side view of the baffle.
Figure 5B:
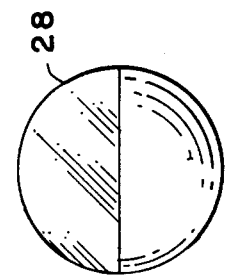
FIG. 5b is a front view of the baffle.
Figure 3:
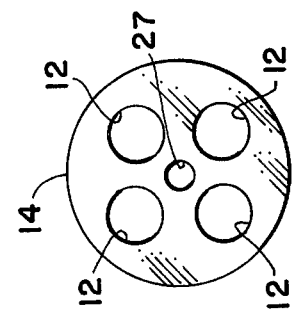
FIG. 3 is a front elevational view of the LED's positioned on the LED board.
Figure 2:
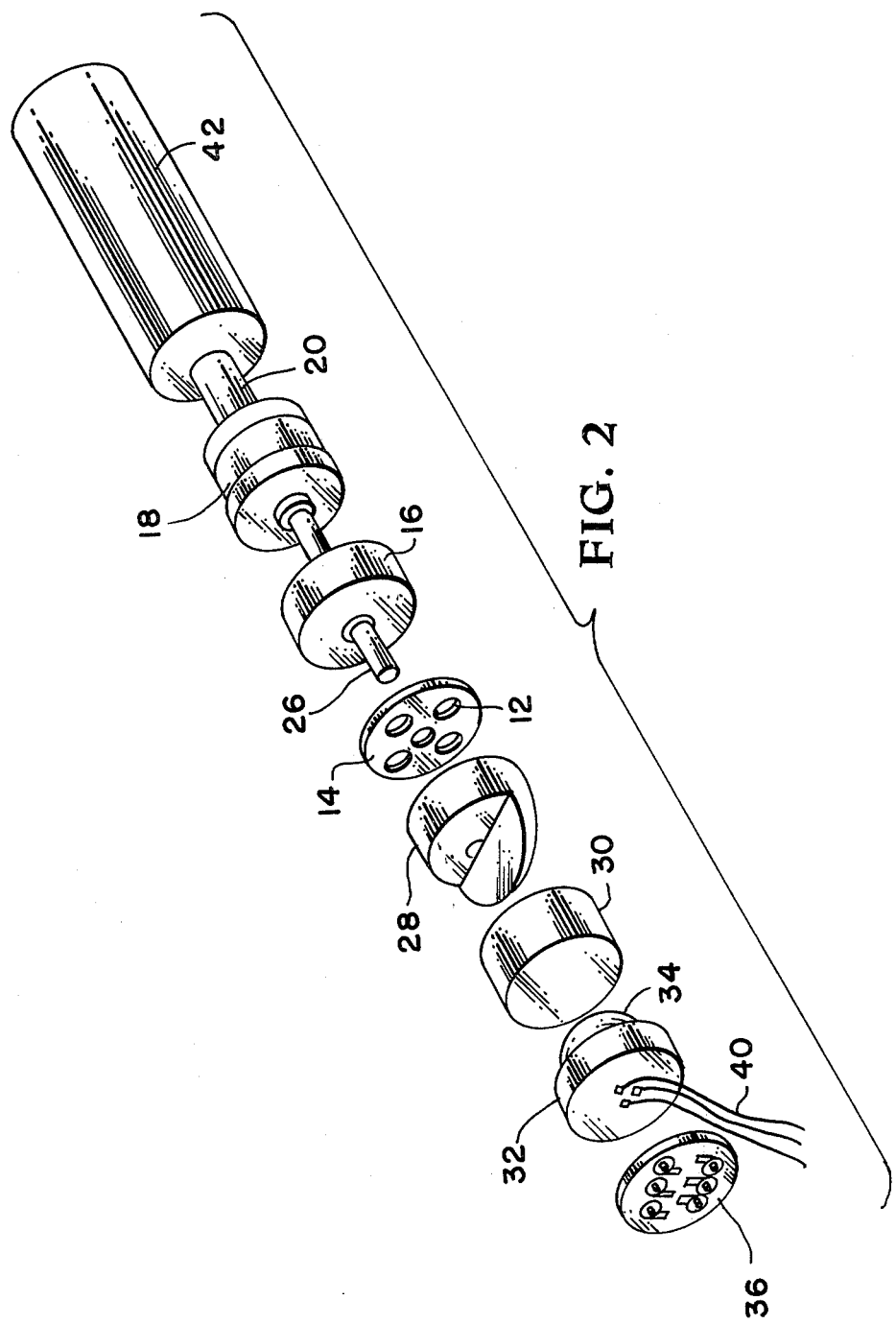
FIG. 2 is an exploded view of the invention which displays all the pieces and how they interact with each other.
Figure 4:
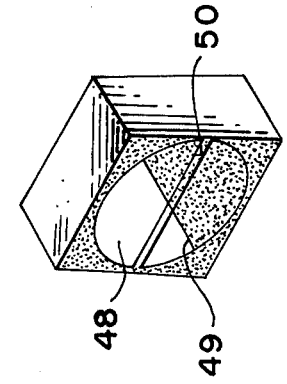
FIG. 4 is a side elevational view of the actuator shaft.
Figure 7:
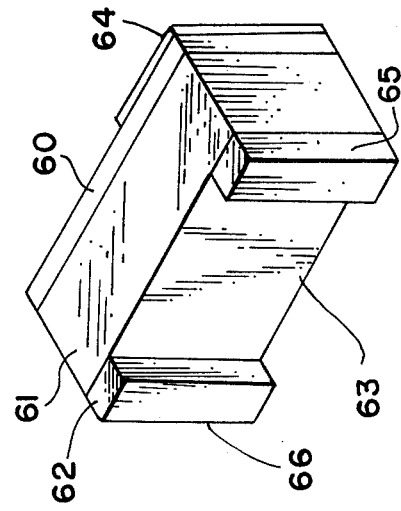
FIG. 7 is an isometric view of a photocell that has been prepared to act as two photocells.

Referring now to FIG. 2, contained within the housing block 42 is a light source 12. The light source 12 can be, as shown in FIG. 3, four LED's positioned equidistantly from the center of the LED board 14 to provide an even illumination. Returning to FIG. 2, LED board 14 engages LED spacer 16 which supports LED board 14 and separates it from bearing housing 18. The bearing housing 18 contains two miniature ball bearings which enable actuator shaft 20 to rotate therein. Actuator shaft 20 contains a groove 22, displayed in FIG. 4, for a spring clip 24 to hold the shaft in the bearings. Shaft 20 is of a smaller diameter 26 after exiting from bearings housing 18 to enable it to slip through a center hole 27 in LED board 14. Returning to FIG. 2, it can be seen that the end of actuator shaft 26 is connectable to light baffle 28 enabling it to rotate with shaft 26. Baffle 28 is painted or masked such that only a semicircular beam of light is transmitted therethrough, as can be seen in FIGS. 5a and 5b. Referring again to FIG. 2, inner sleeve 30 slips over baffle 28 and engages LED board 14 on one side and photocell mount 32 on its other side. Photocell mount 32 holds photocell 34 (FIG. 2) which has been prepared to behave as two photocells. This was accomplished by masking the back of the photocell exposing only two narrow strips along the side edges of the cell. A solution of hydrochloric and nitric acid was applied to etch the gold and nickle coating from the strip along the back of the photocell. FIG. 7 displays the back of a photocell prepared in such a way. The illuminated area is on the side not shown in the figure. The solar cell consists of a layer of p type material 60 on a base of n type material 61. The back is coated with a layer of gold and nickle 62. The gold and nickle coating is etched away along the center of the back of the cell 63. Contact 64 on the front of the cell provides a common contact. The other contacts 65 and 66 are on the back of the cell.

The advantage of this procedure over the use of two distinct photocells is that the sensitivity differs slightly from one photocell to another. By adopting this procedure, two identical photocells are obtained avoiding the necessity of compensating for a slightly less sensitive photocell.

Figure 8:
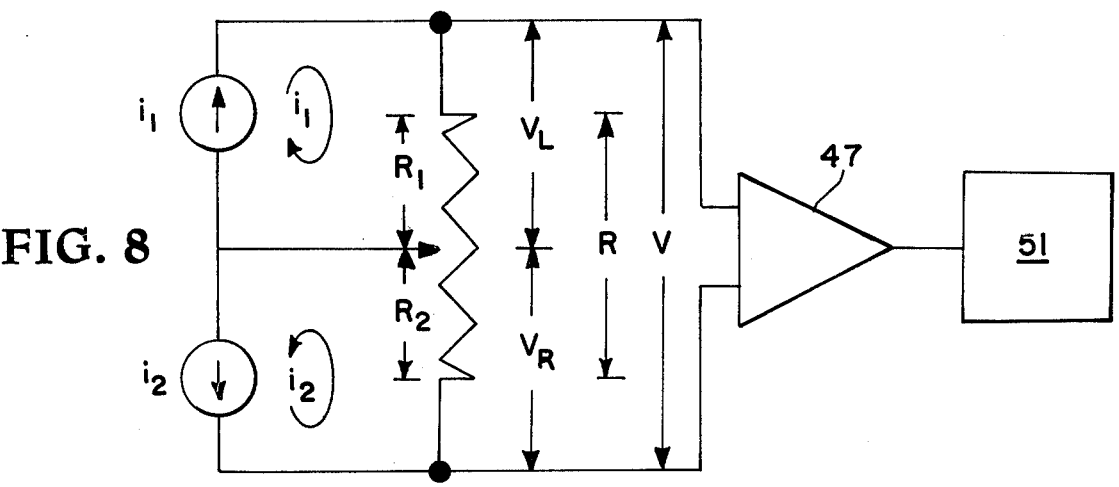
FIG. 8 is a diagram of the electrical circuit used to measure the output of the photocell.

The electrical circuit is displayed in FIG. 8. The photocells are represented by current sources. The current produced by a photocell is directly proportional to the area of illumination of the photocell. The current produced by the photocells runs through a low resistance resistor R. Differential amplifier 47 measures the voltage drop across the resistor. This voltage is displayed on meter 51.

Solder terminal board 36 (FIG. 2) allows easy connections to be made with the LED wires 39 and the photocell wires 40. The entire assembly is pressed into housing block 42. Solder terminal board 36, photocell mount 32, photocells 34, inner sleeve 30, LED board 14, LED's 12, LED spacer 16, and bearing housing 18 remain stationary relative to the housing block 42. Actuator shaft 20, the bearings within bearing housing 18, and baffle 28 are the only moving pieces.

OPERATION OF THE INVENTION

Figure 6A:
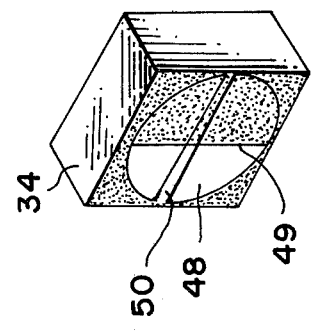
FIG. 6a is an elevational view of the photocell arrangement depicting the illuminated area of the cells when the device is in the null position.
Figure 6B:
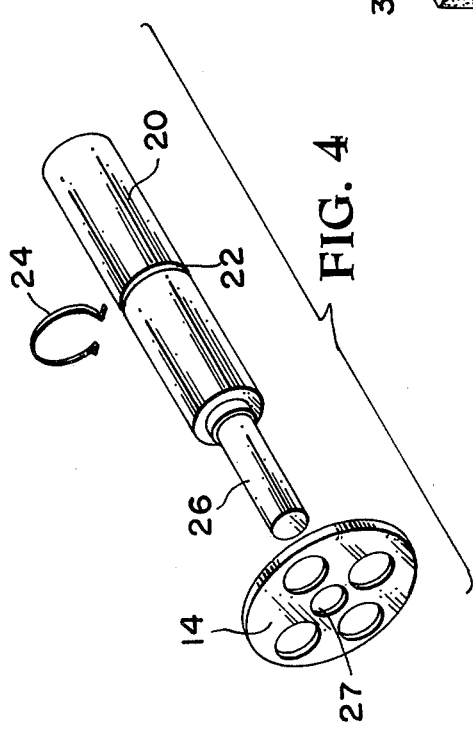
FIG. 6b is a elevational view of the photocell arrangement depicting the illuminated area of the cells when the device is not in the null position.

Output wires 40, as shown in FIG. 1 are connected to a low resistant potentiometer 45 which in turn is connected to a differential amplifier 47. Shaft 20 is rotated until baffle 28 is in a position that the light impinging on the cells 34 is such that the straight edge 49 (FIG. 6a) of the illuminated area 48 is perpendicular to the gap 50 between the cells. The point of intersection of the straight edge 49 of illuminated area 48 and the gap 50 between the cells is aligned precisely with the shaft 20 axis of rotation. This is easily accomplished by observing the output voltage and rotating shaft 20 (FIG. 1) until a null output appears. Shaft 20 is then connected to the object whose angular displacement is to be measured. The axis of rotation of the object must align with the axis of rotation of shaft 20. The object is then angularly displaced which rotates shaft 20 (FIG. 2) which rotates baffle 28. This results in one photocell receiving more light (the top photocell in FIG. 6b) and the other photocell receiving less light (the bottom photocell in FIG. 6b). The current emitted by the other photocell is correspondingly decreased. These currents are fed into potentiometer 45 (FIG. 1) and the differential amplifier measures the voltage across the potentiometer 45. The voltage is indicative of the difference between the two currents. The circuit is shown more clearly in FIG. 8.

$i_1$ = current emitted by 1 photocell $i_2$ = current emitted by the other photocell $R = R_1 + R_2$ $$V = V_L - V_R$$
$$= i_1 R_1 - i_2 R_2$$

the wiper is positioned so that $R_1 = R_2 = \frac{1}{2}R$ thus $$V = \frac{1}{2}R(i_1 - i_2)$$

and the voltage is thus directly proportional to the difference in currents.

The current output of a photocell is directly proportional to the illuminated area thereof. Therefore the voltage as measured by the differential amplifier is directly proportional to the angle of rotation of the object.

Figure 9:
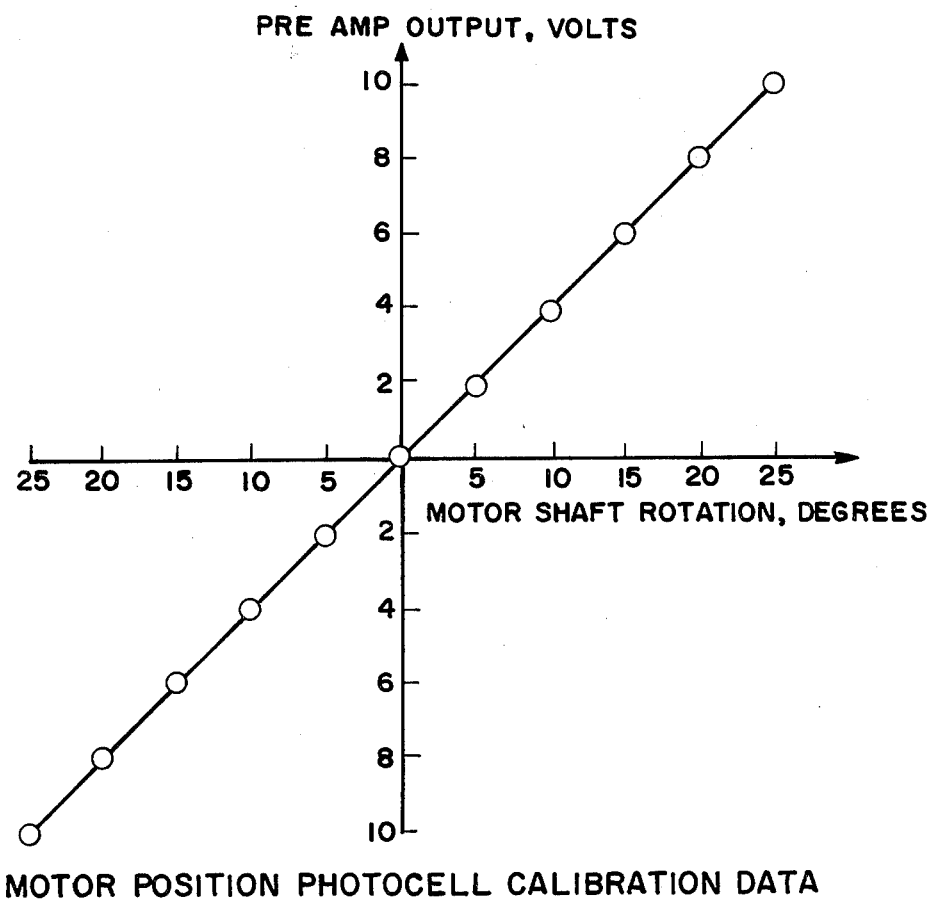
FIG. 9 is a graph relating volts to angles that was experimentally obtained.

FIG. 9 displays a graph of the shaft rotation angle and corresponding voltage output obtained in testing the invention.

It is understood that the foregoing description is of a particular embodiment of the invention and is therefore merely representative. Obviously there are variations and modifications of the present invention in the light of the above teachings. It is, therefore, understood that within the scope of the appended claims the invention may be practical otherwise than as specifically described.

What is claimed as new and desired to be served by Letters Patent of the United States is:

1. A device for measuring the angular displacement of an object comprising:
    (a) radiation means for producing a constant radiation,
    (b) radiation sensing means comprised of two radiation sensitive parts that sense the relative amount of the radiation impinging thereon to determine the angular displacement of said object, and
    (c) radiation obstruction means that rotates in unison with the object being angularly displaced in order to obstruct said radiation such that said radiation impinges upon varying areas of one of said radiation sensitive parts with respect to the other of said radiation sensitive parts, said radiation sensitive parts producing an output that is directly proportional to the rotation of said object.

2. A device as in claim 1 including a housing; said radiation means being supported within said housing;

said radiation means being a light source;

said radiation sensing means being photocells supported within said housing and facing said light source; and said radiation obstruction means being a rotatable baffle supported within said housing and spaced between said light source and said photocells to optically obstruct part of the light path between said light source and said photocells.

3. A device as in claim 2 including a rotatable shaft that is fixed to said baffle, said shaft being attached to said rotating object to enable said baffle to rotate in unison therewith.

4. A device as in claim 2 wherein said baffle obstructs the optical path between said light source and said photocells such that a semi-circular beam of light impinges upon said photocells.

5. A device as in claim 4 wherein said semi-circular beam of light rotates upon said cells, illuminating varying areas of one of said photocells with respect to the other of said photocells, each of said photocells creating an electrical current directly proportional to their respective illuminated areas.

6. A device as in claim 5 including a potentiometer and a differential amplifier, said electrical currents being fed through said potentiometer and said differential amplifier measuring the voltage drop across said potentiometer which is directly proportional to the rotation angle of said shaft.

7. A device as in claim 2 in which said housing isolates said photocells from external light sources.

8. A device as in claim 2 in which wires are connected to said light source, said light source being rigidly fixed in said housing to prevent their rotation therein and to prevent said wires from entanglement.

9. A device as in claim 8 in which wires are connected to said photocells, said photocells and said wires being rigidly fixed in said housing to prevent their rotation therein and to prevent said wires from entanglement.

10. A device for measuring the angular displacement of an object comprising:
    (a) a housing;
    (b) a light source supported within said housing for producing a constant radiation;
    (c) two photocells supported within said housing and facing said light source;
    (d) a rotatable baffle supported within said housing and spaced between said light source and said photocells that obstructs the optical path between said light source and said photocells such that a semicircular beam of light impinges upon said photocells;
    (e) a rotatable shaft that is fixed to said baffle, said shaft being attached to said rotating object to enable said baffle to rotate in unison therewith causing said semicircular beam of light to rotate upon said cells, illuminating varying areas of one of said photocells with respect to the other of said photocells, each of said photocells creating an electrical current directly proportional to their respective illuminated areas;
    (f) a potentiometer connected to said photocells such that said electrical currents from said photocells are fed therethrough; and
    (g) a differential amplifier connected to said potentiometer so as to measure the voltage drop across said potentiometer which is directly proportional to the rotational angle of said shaft.

* * * * *